United States Patent [19]
Noda et al.

[11] Patent Number: 5,435,313
[45] Date of Patent: Jul. 25, 1995

[54] ULTRASONIC PROBE

[75] Inventors: Yoshikatsu Noda; Norihito Soma; Masao Morishita; Masaki Sato, all of Tokyo, Japan

[73] Assignee: GE Yokogawa Medical Systems, Ltd., Tokyo, Japan

[21] Appl. No.: 211,326

[22] PCT Filed: Oct. 7, 1992

[86] PCT No.: PCT/JP92/01304
§ 371 Date: Mar. 28, 1994
§ 102(e) Date: Mar. 28, 1994

[87] PCT Pub. No.: WO93/07728
PCT Pub. Date: Apr. 15, 1993

[30] Foreign Application Priority Data
Oct. 8, 1991 [JP] Japan .................................. 3-260234

[51] Int. Cl.6 ............................................. A61B 8/00
[52] U.S. Cl. .............................................. 128/662.03
[58] Field of Search ..................... 128/661.01, 662.03; 310/334, 336; 29/25.35

[56] References Cited
U.S. PATENT DOCUMENTS

| | | | |
|---|---|---|---|
| 5,176,140 | 1/1993 | Kami et al. | 128/662.03 |
| 5,295,487 | 3/1994 | Saitoh et al. | 128/662.03 |
| 5,327,895 | 7/1994 | Hashimoto et al. | 128/662.03 |

Primary Examiner—Francis Jaworski
Attorney, Agent, or Firm—Moonray Kojima

[57] ABSTRACT

This invention realizes an ultrasonic probe wherein wiring is substantially eliminated between piezoelectric vibrators and signal sending/receiving circuits in the probe. The ultrasonic probe comprises a vibrator array and a semiconductor wafer on which signal sending-/receiving circuits for the vibrator array are integrated, with the wafer being glued to the vibrator array by means of conductive adhesive. Fabricated by being integrated on the semiconductor wafer are signal sending/receiving circuits for individual piezoelectric vibrators positioned coincidently to the arrangement of signal electrodes of the piezoelectric vibrators of the ultrasonic probe, and each signal sending/receiving circuit has a conductive buried layer, which is in connection with the output terminal of the sending circuit and the input terminal of the receiving circuit, exposed to the semiconductor wafer on the side of the vibrator array glued surface.

7 Claims, 4 Drawing Sheets

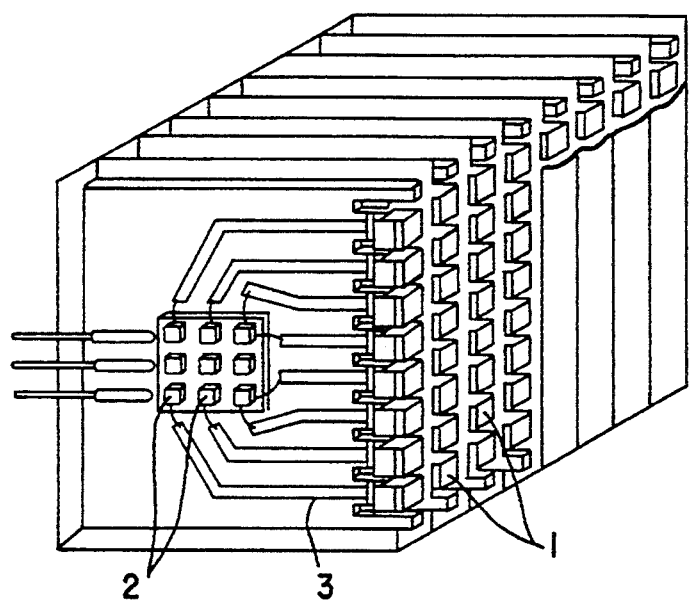
FIG.5
PRIOR ART
FIG.6
PRIOR ART
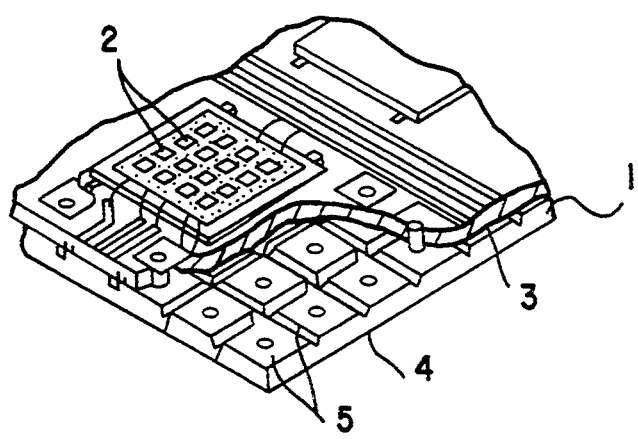

5,435,313

ULTRASONIC PROBE

TECHNICAL FIELD

The present invention relates to a probe used for ultrasonic diagnostic apparatus. More specifically, the invention relates to an ultrasonic probe in which the wiring for electrical connection between the piezoelectric vibrators and signal sending/receiving circuits are eliminated.

BACKGROUND ART

An ultrasonic probe has its individual piezoelectric vibrators connected to signal sending/receiving circuits, by which drive signals is supplied to the piezoelectric vibrators and signals detected by the piezoelectric vibrators are received. A conventional probe has signal sending/receiving circuits formed of component parts that are fabricated by being integrated, and the probe with the integrated circuits built therein has its piezoelectric vibrators and integrated circuits connected electrically through conductive wires. FIG. 5 is a perspective diagram showing an example of the conventional probes. In the figure, reference numeral 1 denotes piezoelectric vibrators that constitute the major part of the probe, and 2 are electronic circuits in connection with the piezoelectric vibrators, with both parts being connected together through connecting conductors 3 that are conductive wires, a flexible substrate, or the like. FIG. 6 shows another example of prior art. In the figure, portions identical to those of FIG. 5 are referred to by the same symbols. In the figure, indicated by 4 is a common electrode of piezoelectric vibrators 1, and 5 are signal electrodes of individual piezoelectric vibrators 1. Since the piezoelectric vibrators and integrated circuits of these conventional probes are connected through conductive wires as mentioned above, the number of electrical wirings increases in the case of a large number of piezoelectric vibrators such as a two-dimensional vibrator array, making the connection much more difficult.

DISCLOSURE OF THE INVENTION

An object of the present invention is to realize an ultrasonic probe wherein wiring is substantially eliminated between the piezoelectric vibrators and signal sending/receiving circuits in the probe.

The inventive ultrasonic probe comprises a vibrator array and a semiconductor wafer on which signal sending/receiving circuits for the vibrator array are integrated, with the wafer being glued to the vibrator array by means of conductive adhesive. Fabricated by being integrated on the semiconductor wafer are signal sending/receiving circuits for individual piezoelectric vibrators positioned coincidently to the arrangement of signal electrodes of the piezoelectric vibrators of the ultrasonic probe, and each signal sending/receiving circuit has a conductive buried layer, which is in connection with the output terminal of the sending circuit and the input terminal of the receiving circuit, exposed to the semiconductor wafer on the side of the vibrator array glued surface.

BRIEF EXPLANATION OF THE DRAWINGS

FIG. 5 is a diagram showing an example of the conventional ultrasonic probes.

FIG. 6 is a diagram showing another example of the conventional ultrasonic probes.

BEST MODE FOR CARRYING OUT THE INVENTION

An embodiment of the present invention will be described in detail with reference to the drawings.

Figure 1:
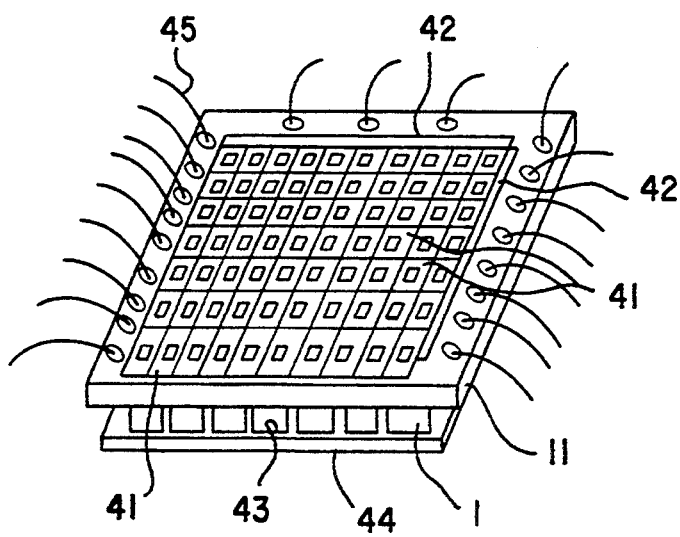
FIG. 1 is a perspective diagram of the ultrasonic probe based on an embodiment of this invention.

FIG. 1 is a perspective diagram of the ultrasonic probe based on an embodiment of this invention. In the figure, reference numeral 1 denotes multiple piezoelectric vibrators, which are arranged in a two-dimensional matrix to form a two-dimensional vibrator array of the ultrasonic probe. 11 is a semiconductor wafer, and 41 are individual integrated circuits (i.e. elemental ICs) that are fabricated on the wafer 11 in correspondence to the piezoelectric vibrators. 42 is a peripheral circuit connected to the elemental ICs 41, and it includes a control circuit and adding circuit. The wafer 11 is glued to the two-dimensional vibrator array by means of conductive adhesive or the like. 43 is a common electrode of the piezoelectric vibrators 1, with an acoustic matching layer 44 being provided in contact with it. The transmission and reception of the ultrasonic wave take place through this acoustic matching layer for an object under test that is located beneath the device in the figure. 45 are signal lines that connect the integrated circuits on the wafer 11 to the main unit of the ultrasonic diagnostic apparatus. The surface of the semiconductor wafer on which the integrated circuits are fabricated, is covered with a proper protective layer, which is further overlaid by a backing material when necessary.

Figure 2A:
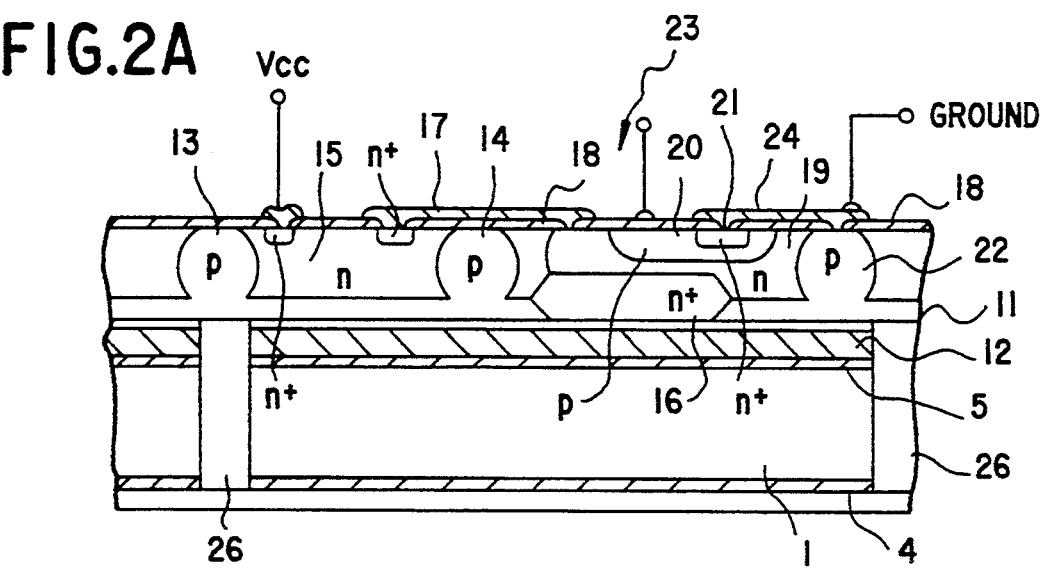
FIGS. 2(A) and 2(B) are diagrams showing the detailed structure of the ultrasonic probe shown in FIG. 1.
Figure 2B:
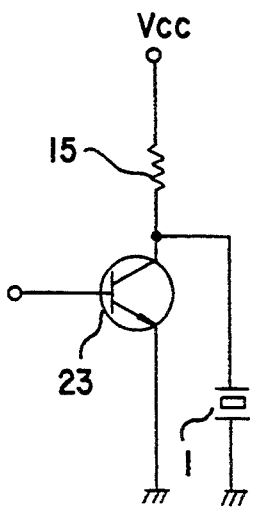

FIGS. 2(A) and 2(B) are diagrams showing an example of the linked state of one piezoelectric vibrator and the associated elemental IC. Shown by FIG. 2(A) is a conceptual cross-sectional diagram, and FIG. 2(B) is a corresponding electrical equivalent circuit diagram. Shown here for example as an integrated circuit is the final output stage of the drive circuit of a piezoelectric vibrator. In the FIG. 2(A), reference numeral 1 is a piezoelectric vibrator, 4 is a common electrode, and 5 is a signal electrode. 11 is a semiconductor wafer, which is glued to the signal electrode 5 of the piezoelectric vibrator 1 by means of conductive adhesive 12. Fabricated on the semiconductor wafer 11 are a resistor 15 and transistor 23 to be connected to the piezoelectric vibrator 1. The resistor 15 is formed as an n-type layer by the injection of phosphorus between isolation layers 13 and 14, while the transistor 23 is formed as an npn-type transistor having its collector 19, base 20 and emitter 21 formed between the isolation layers 14 and 22. One end of the resistor 15 and the collector 19 of the transistor 23 are connected by an aluminum wire 17 formed on the oxide layer 18. The resistor 15 has its other end led out to the power supply line. The transistor 23 has its base 20 led out to the drive signal source and its emitter 21 led out to the ground through an aluminum wire 24. A buried layer 16 of $n^+$ type is formed on the surface of the wafer 11 on the side of the piezoelectric vibrator, and it is exposed to the rear surface of the wafer 11. This buried layer 16 is connected to the collector 19 of the transistor 23 inside the wafer 11. The buried layer 16 has its exposed portion connected electrically by the conductive adhesive 12 to the signal electrode 5 of the piezoelectric vibrator. Consequently, the driving transistor 23 and the piezoelectric vibrator 1 are connected electrically without using a lead wire. The input terminal of the receiving circuit that receives the detected signal of the piezoelectric vibrator 1 is connected to the signal electrode of the piezoelectric vibrator 1 by using the buried layer 16 or another buried layer formed in the same manner. In this manner, even if the probe has an extremely large number of piezoelectric vibrators, such as a two-dimensionally arrayed probe, individual piezoelectric vibrators and signal sending/receiving circuits can be connected very easily. A cut 26 is to separate adjacent piezoelectric vibrators. The cut 26 does not divide the wafer 11 into pieces.

Figure 3:
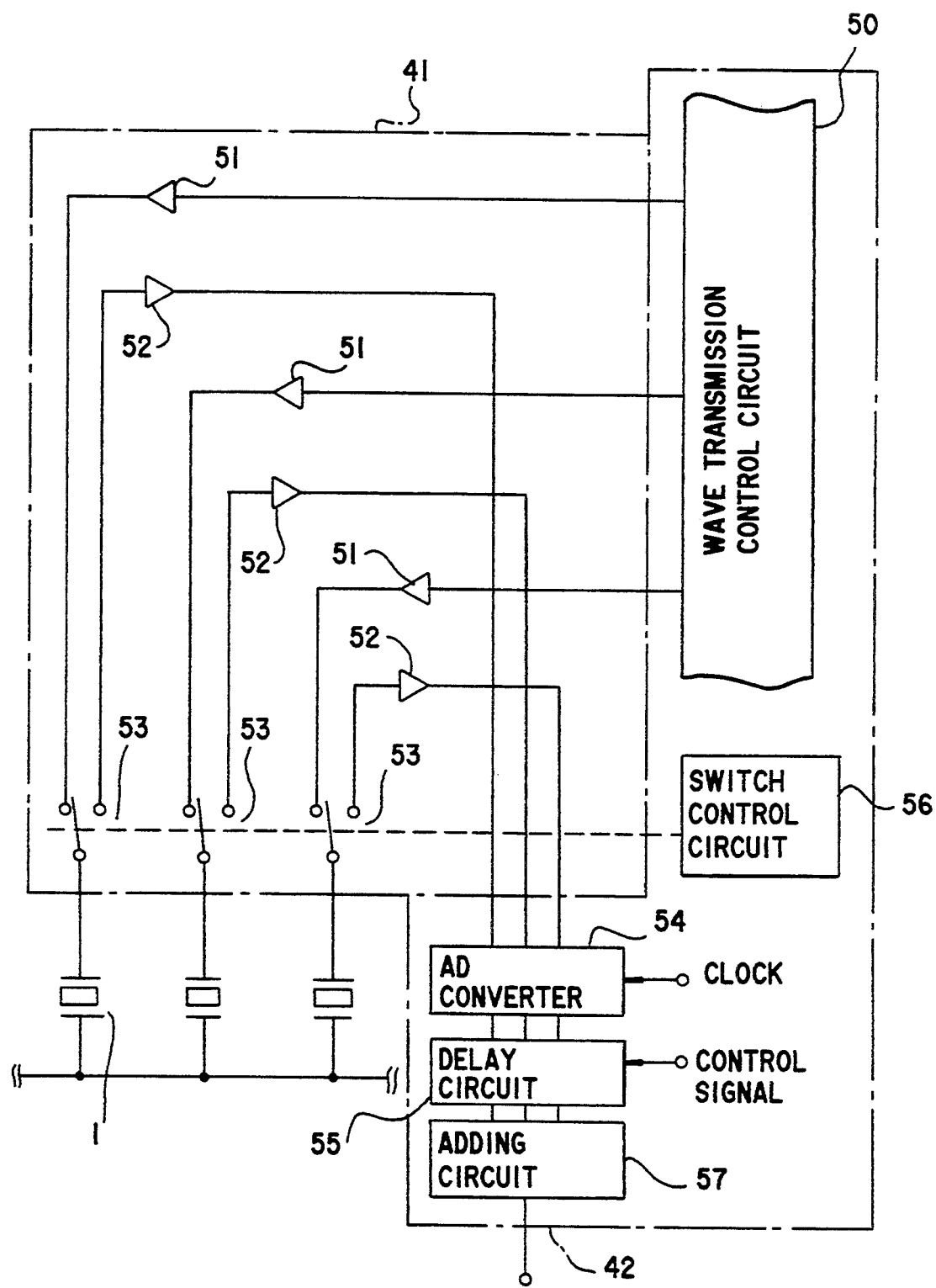
FIG. 3 shows an example of the electrical arrangement of the ultrasonic probe shown in FIG. 1.

FIG. 3 is a diagram showing an example of the electrical arrangement of the integrated circuits formed on the wafer 11 of the ultrasonic probe shown in FIG. 1. An electric circuit included in the elemental IC for each piezoelectric vibrator includes a sending amplifier 51, a receiving amplifier 52 and a send/receive mode switch 53. An electric circuit included in the peripheral circuit 42 includes a transmission control circuit 50, an A/D converter 54, a delay circuit 55, a switch control circuit 56 and an adding circuit 57. The arrangement of these electric circuits is identical to that of the sending-/receiving circuit section of the usual diagnostic apparatus.

Figure 4A:
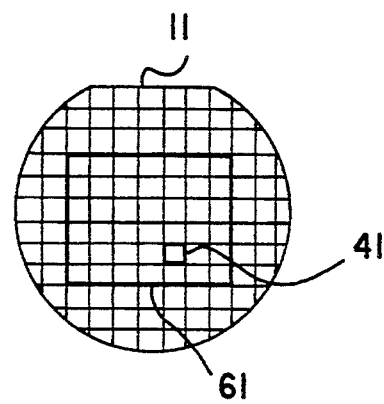
FIGS. 4(A) and 4(B) are diagrams showing an example of the method of fabricating the integrated circuits on the semiconductor wafer of the ultrasonic probe shown in FIG. 1.
Figure 4B:
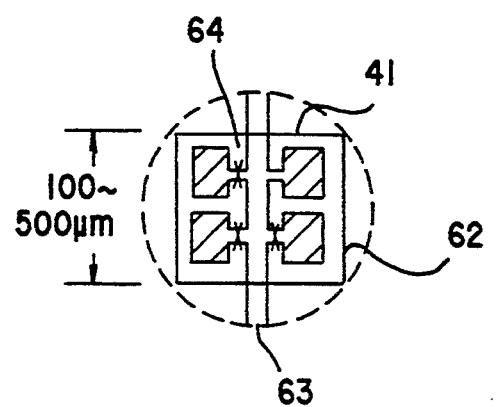

FIGS. 4(A) and 4 (B) are diagrams showing an example of the method of fabricating the integrated circuits on the semiconductor wafer of the ultrasonic probe. On the semiconductor wafer, the elemental ICs, which are arranged in the array pitch (100–500 μm) of the piezoelectric vibrators 1, and the peripheral circuit are formed, and IC chip blocks 61 of the size of matrix of the vibrator array are cut out of the wafer. The elemental IC 41 has an arrangement of multiple, e.g., four, same electronic circuits 62, and after the characteristic test, all but one circuit are disconnected by using the laser trimming technique or the like. Consequently, it becomes possible to enhance the yield of signal sending-/receiving circuits fabricated on the semiconductor wafer.

We claim:

1. In an ultrasonic probe comprising a piezoelectric vibrator and a signal transmitting and receiving circuit, said circuit being fabricated as an integrated circuit on a semiconductor wafer; the improvement comprising said circuit comprising a transmitting means with an output terminal, a receiving means with an input terminal, and a conductive layer connected to said input terminal and said output terminal and being exposed on one surface of said semiconductor wafer;

said semiconductor wafer and said piezoelectric vibrator being attached together with a conductive adhesive so that said conductive layer is in contact with said piezoelectric vibrator and so that said ultrasonic probe is formed of a unitary structure comprising said piezoelectric vibrator and said signal transmitting and receiving circuit attached together with no additional wiring therebetween.

2. The probe of claim 1, wherein said piezoelectric vibrator has an electrode to which said conductive layer of said semiconductor wafer is attached.

3. In an ultrasonic probe comprising a piezoelectric vibrator and a signal transmitting and receiving means, said means being fabricated as integrated circuits on a semiconductor wafer; the improvement comprising said means comprising a plurality of transmitting and receiving circuits, with only one being electrically operable at one time, said transmitting circuit having an output terminal and said receiving circuit having an input terminal, and a conductive layer connected to said input terminal and said output terminal and being exposed on one surface of said semiconductor wafer;

said semiconductor wafer and said piezoelectric vibrator being attached together with a conductive adhesive so that said conductive layer is in contact with said piezoelectric vibrator and so that said ultrasonic probe is formed of a unitary structure comprising said piezoelectric vibrator and said signal transmitting and receiving means attached together with no additional wiring therebetween.

4. The probe of claim 3, wherein said piezoelectric vibrator has an electrode to which said conductive layer of said semiconductor wafer is attached.

5. In an ultrasonic probe comprising a plurality of piezoelectric vibrators disposed in an array, and a plurality of signal transmitting and receiving means corresponding to said plurality of piezoelectric vibrators, said means being fabricated as integrated circuits on a semiconductor wafer; the improvement comprising each of said plurality of signal transmitting and receiving means comprising a transmitting circuit with an output terminal, a receiving circuit with an input terminal, and a conductive layer connected to said input terminal and said output terminal and being exposed on one surface of said semiconductor wafer;

said semiconductor wafer and said plurality of piezoelectric vibrators being attached together with a conductive adhesive so that said conductive layer of each signal transmitting and receiving means is in contact with a corresponding piezoelectric vibrator, and so that said ultrasonic probe is formed as a unitary structure comprising said piezoelectric vibrators and said signal transmitting and receiving means attached together with on additional wiring therebetween.

6. The probe of claim 5, wherein only one signal transmitting and receiving circuit is electrically operable for each corresponding piezoelectric vibrator.

7. The probe of claim 5, wherein said piezoelectric vibrators each has an electrode to which said conductive layer of said wafer is attached.

* * * * *